United States Patent [19]
Smith et al.

[11] Patent Number: 5,633,477
[45] Date of Patent: May 27, 1997

[54] ELECTRICALLY CONDUCTIVE PREPREG FOR SUPPRESSING CORONA DISCHARGE IN HIGH VOLTAGE DEVICES

[75] Inventors: James D. B. Smith, Monroeville; Karl F. Schoch, Jr., Pittsburgh, both of Pa.; Franklin T. Emery, Orlando, Fla.

[73] Assignee: Westinghouse Electric Corporation, Pittsburgh, Pa.

[21] Appl. No.: 242,817

[22] Filed: May 16, 1994

[51] Int. Cl.$^6$ .................................................. H01F 27/34
[52] U.S. Cl. ..................... 174/138 E; 174/140 R; 336/84 C; 336/96; 336/205
[58] Field of Search ................ 174/140 R, 138 E; 336/205, 206, 96, 84 R, 84 C, 84 M

[56] References Cited

U.S. PATENT DOCUMENTS

| | | | |
|---|---|---|---|
| 2,705,292 | 5/1955 | Wagenseil | 310/196 |
| 3,960,803 | 6/1976 | Smith et al. | 260/37 |
| 4,013,987 | 3/1977 | Foster | 336/206 |
| 4,105,984 | 8/1978 | Smith et al. | 336/205 X |
| 4,112,183 | 9/1978 | Smith | 428/363 |
| 4,399,190 | 8/1983 | Iwabuchi et al. | 428/336 |
| 4,487,996 | 12/1984 | Rabinowitz et al. | 174/105 R |
| 4,540,967 | 9/1985 | Chitose | 336/84 C |
| 4,803,096 | 2/1989 | Kuhn et al. | 427/121 |
| 4,877,646 | 10/1989 | Kuhn et al. | 427/121 |
| 4,935,302 | 6/1990 | Hjortsberg et al. | 428/383 |
| 4,975,317 | 12/1990 | Kuhn et al. | 428/253 |
| 4,981,718 | 1/1991 | Kuhn et al. | 427/121 |
| 5,108,829 | 4/1992 | Kuhn | 428/253 |
| 5,162,135 | 11/1992 | Gregory et al. | 427/121 |

FOREIGN PATENT DOCUMENTS

| | | |
|---|---|---|
| 2755050 | 6/1979 | Germany . |
| 3102849 | 8/1982 | Germany . |

OTHER PUBLICATIONS

Patent Abstracts of Japan, vol. 13, No. 333 (E–794) 26 Jul. 1989, Abstract of JP-A-01-097148 (Toshiba) 14 Apr. 1989.

Primary Examiner—Kristine L. Kincaid
Assistant Examiner—Paramita Ghosh
Attorney, Agent, or Firm—R. P. Lenart

[57] ABSTRACT

A resin-rich electrically conductive felt material is described. The described conductive felt can be used to suppress corona discharge in high voltage generator coils. The conductive felt is prepared by treatment with electrically conducting polymers, such as polyaniline and polypyrrole, and resistivity values ranging from 4,000 to 100,000 ohms may be obtained. This treated felt can be readily impregnated with thermoset resins, such as epoxies, to provide flexible prepregs suitable for coil bonding applications in turbine generators.

15 Claims, 5 Drawing Sheets

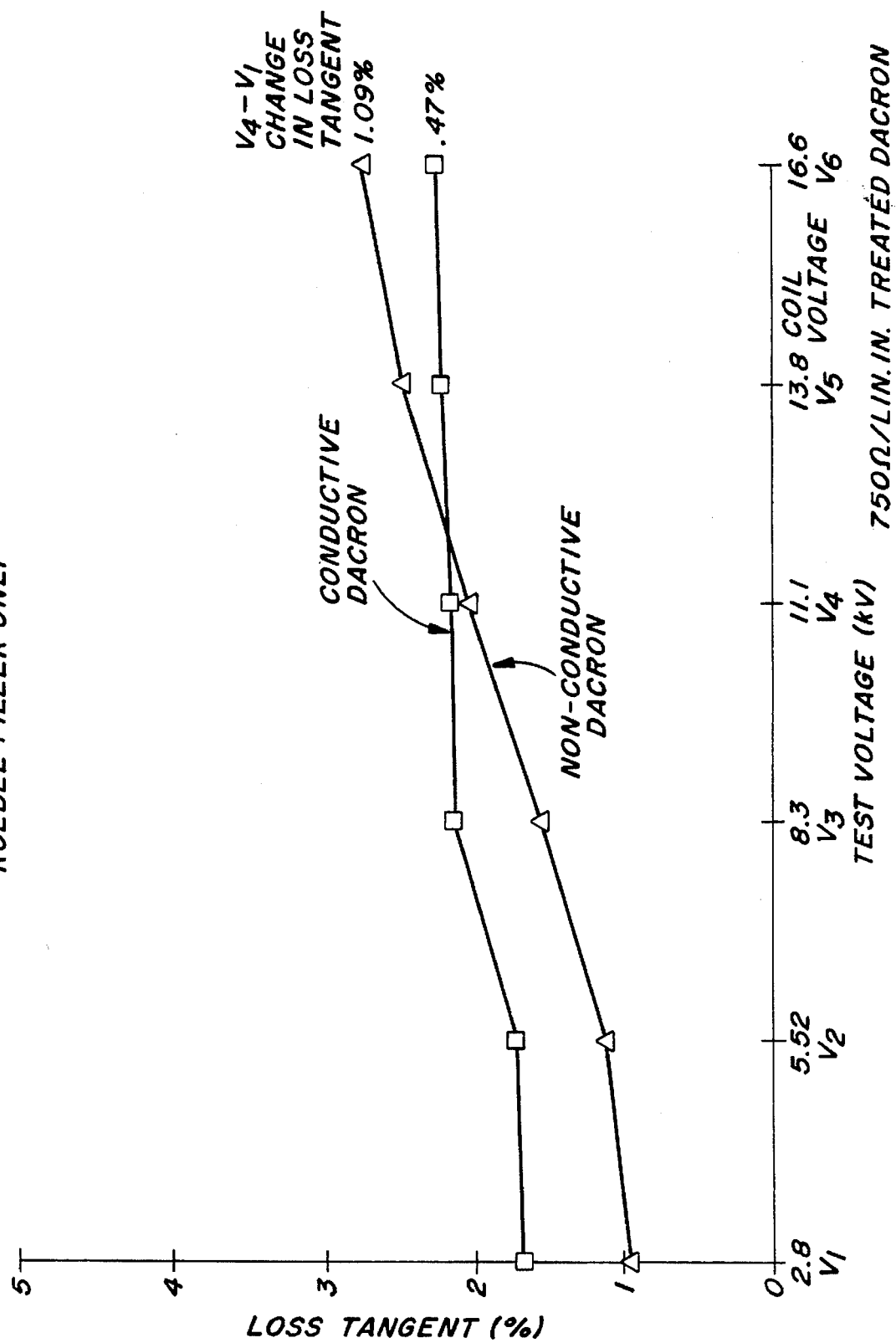

5,633,477

ELECTRICALLY CONDUCTIVE PREPREG FOR SUPPRESSING CORONA DISCHARGE IN HIGH VOLTAGE DEVICES

BACKGROUND OF THE INVENTION

The present invention relates generally to the field of reinforcing or molding materials impregnated with a synthetic resin (i.e., prepreg materials). More particularly, the present invention relates to an electrically conductive prepreg for suppressing corona discharge in high voltage devices.

Prepreg materials have been used for many years to initially bond inner-cooling channels to high voltage coils prior to the application of a ground wall insulation. Typically, a Dacron-felt material is treated with a thermoset resin to prepare a prepreg material positioned between the inner-cooling channels and coil strips of a high voltage coil. The assembly is heated to cure the prepreg material and effect the bonding of the assembly sufficient to permit its handling. The assembly is then provided with a ground wall insulating cover, usually by wrapping layers of mica tape around the assembly. Because the mica insulation is relatively brittle, the entire assembly is impregnated under pressure with a solventless impregnant. When cured, the impregnant provides the required strength and stability as well as a bond between the ground wall and coil strips.

U.S. Pat. No. 3,960,803, Jun. 1, 1976, titled "Flexible Nontacky Prepreg for Bonding Coils In High Voltage Devices And Method Of Making Said Prepreg," discloses a resin-treated fibrous mat prepreg comprising an epoxy-anhydride resin-loaded DACRON polyester felt, which is process compatible with a vacuum pressure impregnant (i.e., a styrene-epoxy-anhydride impregnant). U.S. Pat. No. 4,112,183, Sept. 5, 1978, titled "Flexible Resin Rich Epoxide-Mica Winding Tape Insulation Containing Organo-Tin Catalysts," discloses a flexible mica winding tape of the type referred to above. These two patents may be referred to for further information on prepreg materials and mica winding tape.

FIG. 1 schematically depicts a high voltage inner-cooled half-coil assembly as disclosed in the above-cited U.S. Pat. No. 3,960,803. As disclosed in the patent, the inner-cooled high voltage coil 10 includes first rows 11 of copper coil strips. The individual coil strips are coated with glass fibers prior to being used in the assembly, and may include an additional coating of insulating varnish or the like. A first prepreg layer 12 comprising a fibrous mat made of glycol ethylene terephthalate polymeric ester fibers treated with epoxy-anhydride resin is positioned between the coil rows 11. In addition, inner-cooling channels 13 and 14 are positioned adjacent coil rows 11, and second layers 16, 17 of epoxy-anhydride fibrous mat prepreg are positioned between the rows of coil strips 11 and the inner-cooling coils 13, 14. A third set of prepreg layers 18, 19 are positioned adjacent inner-cooling channels 13 and 14 as shown. Rows of coil strips 21 and 22 are positioned on the third prepreg layers 18, 19; and a fourth set of prepreg layers 23, 24 are positioned adjacent the coil strips 21 and 22, as shown.

The '803 patent further discloses that the assembled array of coils, channels, and prepreg layers are heated in a bonding furnace to provide an integrally bonded, partially cured assembly. The assembly is subsequently covered with a mica ground wall 26, which is wrapped around the assembled unit to provide the required insulation and protection to the coils. The wrapped assembly is then impregnated under pressure with a styrene-epoxy-anhydride impregnant and heated. The fully cured assembly provides an integrally bonded inner-cooled high voltage coil 10 in which the impregnant is bonded to at least a portion of the prepreg.

However, even with the high degree of process compatibility between the impregnant and resin-loaded felt, the present inventors have discovered that "microvoids" form at the mica/felt interface. These microvoids result in corona and unacceptable loss tangents (tan $\delta$) at high voltages.

SUMMARY OF THE INVENTION

Accordingly, a primary object of the present invention is to provide a means for suppressing corona discharges in high voltage devices such as, e.g., high voltage generator coils and the like. A further object of the present invention is to provide an electrically conductive felt loaded with a suitable resin, to provide a solution to the corona discharge problem that fits conveniently into existing manufacturing practices.

The objects of the invention are achieved by providing a high voltage coil assembly comprising an electrically conductive prepreg for suppressing corona discharge. Preferably, the prepreg is positioned in a region of high electrical stress, e.g., between a high voltage coil and an insulating wrap. For example, the prepreg may be positioned in the Roebel transposition used in rotating power machinery. The prepreg preferably comprises an electrically conductive fibrous felt saturated with a resin. The electrically conductive fibrous felt may comprise a polyester, e.g., DACRON polyester, coated with a polyaniline (including its alkylated modifications) or polypyrrole composition. Other coated fabrics made from NOMEX or KEVLAR fibers, or glass are also suitable. Polyphenylene sulfide, polythiophene, and polyacetylene are other conducting polymer compositions that could be used. DACRON, NOMEX and KEVLAR are registered trademarks of E. I. DuPont De Nemours and Company.

BRIEF DESCRIPTION OF THE DRAWINGS

FIG. 4 is a plot of data for Example 3 described below. In particular, this plot shows the measured loss tangent and tip-up versus test voltage for conductive and non-conductive DACRON polyester samples, respectively.

DETAILED DESCRIPTION OF PREFERRED EMBODIMENTS

Figure 1:
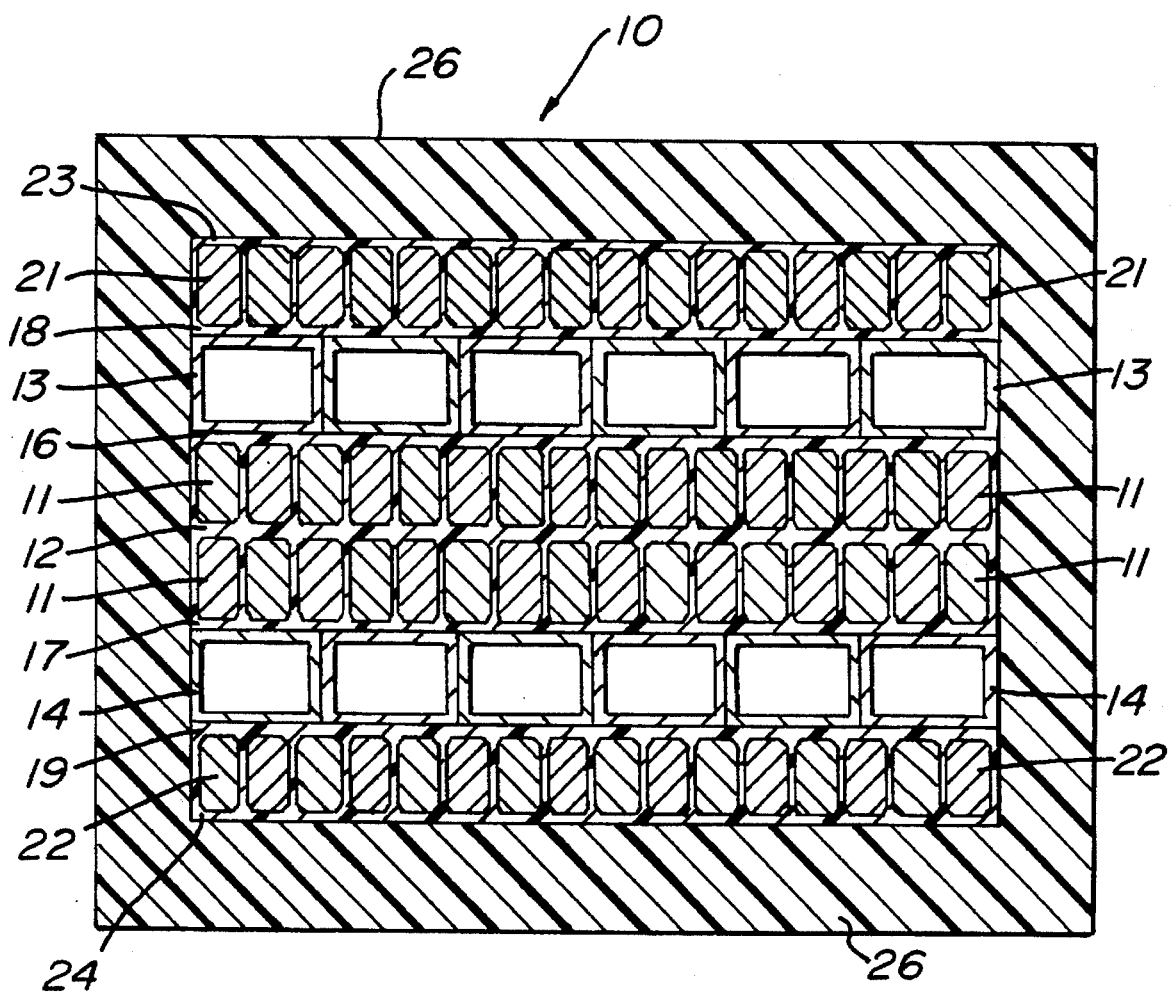
FIG. 1 schematically depicts a sectional elevation of a fully assembled and cured inner-cooled high voltage coil in accordance with the prior art.
Figure 2:
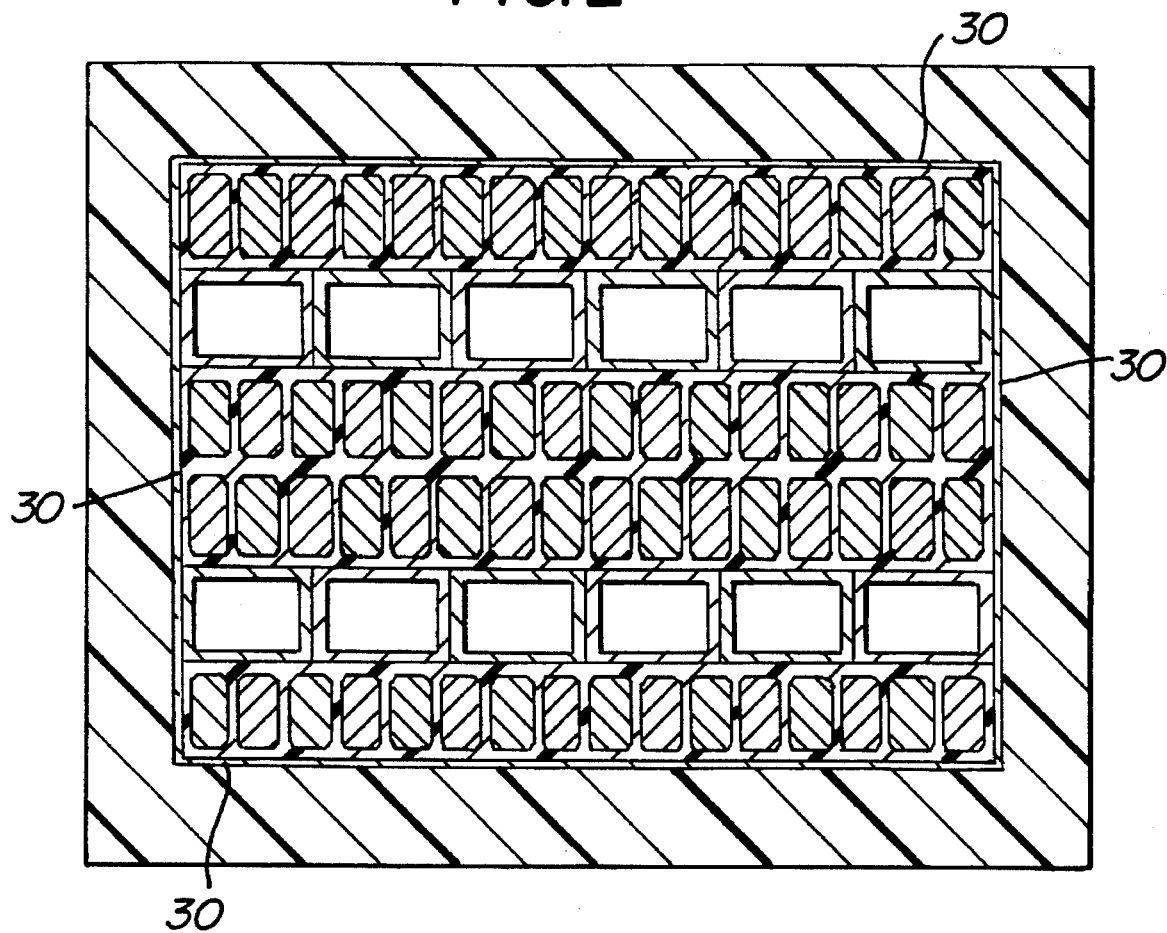
FIG. 2 schematically depicts an improved assembly of the type depicted in FIG. 1 in accordance with the present invention.

According to one preferred embodiment of the present invention, a novel corona suppression material comprising an electrically conductive fibrous felt material (e.g., DACRON polyester polyester) is saturated with an advanced state-of-cure thermoset resin (e.g., epoxy-anhydride resin), which is process compatible with a vacuum pressure impregnating resin used to bond mica layers in the ground wall insulation of a high voltage coil. FIG. 2 illustrates how this conductive prepreg material is used in the construction of a high voltage coil. As shown, the conductive prepreg 30 is positioned in regions of high electrical stress, i.e., between the mica tape and conductors, and in the Roebel transposition used in rotating power machinery. Depending on the construction and geometry of the coil, other locations for the conductive prepreg are possible.

Figure 3:
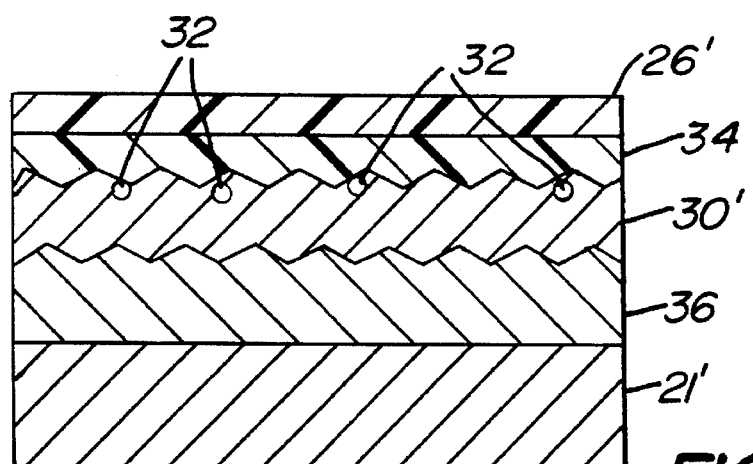
FIG. 3 schematically depicts how conducting felt can be employed to suppress corona discharges in the coil ground wall insulation.

FIG. 3 depicts how semiconducting felt (DACRON polyester) 30' suppresses corona discharge in the coil ground wall insulation 26' (mica tape). Microvoids 32 in the area of the felt will be surrounded by conductive pathways, which will effectively short-circuit the corona discharge. Layers of VPI resin 34 and insulating DACRON polyester 36 (optional) are also shown.

According to a presently preferred embodiment of the invention, fabric preparation occurs in two steps: (1) coating with a conducting polymer, followed by (2) impregnation with a suitable thermoset resin. Application of the conducting polymer coating may be carried out in the manner disclosed in U.S. Pat. No. 4,803,096, Feb. 7, 1989, titled "Electrically Conductive Textile Materials and Method For Making Same." The procedure for coating fibers described in the '096 patent may be modified for the felt materials employed in the present invention by carrying out the polymerization at low temperature and, in the case of polypyrrole, with an added dopant. These modifications produce a felt material with low resistance and no clumps of polymer trapped in the felt. In the following examples, the resistance of the felt was determined by reaction time.

EXAMPLE 1

Polyaniline

A reaction mixture consisting of 1500 ml of 1 M HCl, 1.5 ml aniline, and 3.75 g $(NH_4)_2S_2O_8$ was prepared and maintained at 10°–12° C. Samples of bare DACRON polyester felt strips were suspended in the solution and withdrawn after various times. The samples were washed with 1 M HCl and allowed to dry in air. The results are summarized in Table 1. The resistance of these materials was 50,000–60,000 Ω and was determined by a two-probe resistance measurement (0.8 cm electrode spacing). A resistance of 2,000 Ω has been obtained by performing the reaction at 0° C.

TABLE 1

| Dacron/Polyaniline Characteristics | | |
|---|---|---|
| Sample No. | Weight Change After Coating (g) | Time in Reaction Mixture (h) | Resistance (Ω) |
| 1 | 0.03 | 1.5 | 50,000 |
| 2 | 0.03 | 2.25 | 50,000 |
| 3 | 0.01 | 3.0 | 60,000 |
| 4 | 0.03 | 3.75 | 50,000 |
| 5 | 0.03 | 4.5 | 60,000 |

Roller-milling of this conductive solution onto a fibrous felt is also suitable.

EXAMPLE 2

Polypyrrole

A reaction mixture of 1500 ml water, 1.0 ml pyrrole, 5.1 g $FeCl_3$, and 2.9 g p-toluene sulfonic acid was prepared and maintained at 10°–12° C. DACRON polyester felt strips were suspended in the solution and withdrawn after various times. The samples were washed with water and dried in air. The results are summarized in Table 2. The resistance of these materials ranged from 4,000 to 100,000 Ω as determined by a two-probe resistance measurement (0.8 cm between electrodes). A resistance as low 1,000 Ω has been obtained by performing the reaction at 0° C.

TABLE 2

| Dacron Polyester/Polypyrrole Characteristics | | |
|---|---|---|
| Sample No. | Weight Change After Coating (g) | Time in Reaction Mixture (h) | Resistance (Ω) |
| 1 | 0.00 | 1.0 | 100,000 |
| 2 | 0.00 | 2.0 | 40,000 |
| 3 | 0.01 | 3.0 | 5,000 |
| 4 | 0.01 | 4.0 | 5,000 |
| 5 | 0.03 | 5.0 | 4,000 |

In the second step, the dried, coated felts were dipped into a solution of a suitable thermoset resin. In these examples, "MB-1" was used, which consisted of 138 g DE-661, 22 g ECA-100, 22 g HHPA, and 111 g each of MEK and toluene. The felts were squeezed to remove excess resin and dried at 135° C. for 2 minutes or at room temperature overnight to remove solvent.

The resin-treated felts have been subjected to the normal "bakelizing" cycle (135° C. for 45 minutes) without decomposition of the conducting polymer. The measured surface resistance was much higher after bakelizing because of the high resin content. Typically, the measured two-probe resistance is 2–10 MΩ. Presumably, the resistance in the felt itself does not change significantly.

EXAMPLE 3

Polypyrrole-Coated DACRON Polyester

Two polypyrrole-coated DACRON polyester strips were prepared as follows: 2.0 ml of pyrrole was dissolved in 1,860 ml of deionized water with stirring at room temperature. Separately, 10.24 g of $FeCl_3$ and 5.7 g p-toluene sulfonic acid monohydrate were dissolved in 140 ml of de-ionized water. When the pyrrole was dissolved, the $FeCl_3$ solution was added and then two 38-inch by 2-inch (96-cm by 5-cm) strips were placed in the beaker. The reaction was allowed to proceed for 18 hours. When the reaction was complete, the strips were removed and rinsed several times with fresh de-ionized water. The strips were then dried in air for 24 hours before measuring the surface resistance. The surface resistance of these strips was approximately 15,000 Ω/sq. The strips were subsequently impregnated with epoxy resin solution to a level of 71–73% resin (after evaporation of solvents).

A trial coil was processed in the laboratory using a sample of conductive polymer-treated DACRON polyester felt. A 96-inch (244-cm) long coil section was made with 48 inches (122 cm) of epoxy resin-treated DACRON polyester Roebel filler and 48 inches of conductive polymer. Both sections were processed together and the power factor was measured. The results are depicted in FIG. 4, which plots the measured loss tangent (percent) and tip-up (percent) versus the test voltage. The tip-up, defined as $V_4$–$V_1$, was 0.47% for the conductive DACRON polyester and 1.09% for the non-conductive DACRON polyester. In this experiment, the conductive filler was not electrically connected to the copper.

EXAMPLE 4

Polypyrrole/Polyester and Polyaniline/Polyester Felt

This study showed that substituting a partially conducting polyester filler material for insulating polyester filler material can reduce the increase in loss tangent within increasing voltage (i.e., tip-up) observed in bars simulating generator coils. The polypyrrole-coated polyester performed better than the conventional insulating material and the polyaniline-coated polyester.

As discussed above, power factor or loss tangent tip-up in high voltage devices can increase when the voltage is increased. This phenomenon is attributed to partial discharge occurring in voids in the insulation materials. These voids are caused by incomplete resin impregnation, shrinkage during cure, or interfacial delamination between material surfaces. One likely place for such voids is the polyester filler material used around Roebel crossovers and between stacks in a high voltage coil. The objective of the study which is the subject of this example was to determine whether using a partially conductive filler would prevent partial discharges in the insulation by preventing the accumulation of a high electric field on any voids that might be present. The materials investigated were insulating materials that were coated with a conducting polymer to impart partial surface conductivity. In particular, polypyrrole (PPy) and polyaniline (PAn) were coated on an insulating non-woven polyester felt prior to impregnation. The electrical performance was evaluated using standard test bars having slots filled with the materials being considered.

As mentioned above, U.S. Pat. No. 4,803,096 discloses a process for depositing these conducting polymers on a fibrous support. After this process is performed, the finished material has the conducting polymer attached to its surface and not free to migrate. As such, it offers advantages over carbon-filled pastes in which the carbon may migrate to areas other than where intended. Furthermore, the conductivity of conducting polymers can be varied over a wide range for specific requirements.

Polypyrrole/Polyester Felt

Commercially available bare polyester felt strips were coated with polypyrrole. The strips were suspended in an aqueous solution containing 0.042 M $FeCl_3$ and 0.02 M p-toluene sulfonic acid at 0° C. The reaction began upon addition of pyrrole to a final concentration of 0.02 M. The solution gradually darkened during the reaction until it was black. After 1–5 hours, the strips were removed, rinsed with water, and dried in air.

Polyaniline/Polyester Felt

Polyester felt was also coated with polyaniline. Polyester strips were suspended in a solution of 1 M HCl and 0.011 M $(NH_4)_2 S_2O_8$ at 0° C. Aniline was added to a final concentration of 0.011 M. After a latent period, the color of the solution changed gradually to dark green. The strips were removed after 3–7 hours and rinsed with 1 M HCl and then dried in air.

Felt Impregnation

Both felt materials were impregnated with a mixed carboxylic anhydride-epoxy resin solution, chemically similar to the resin employed in preparing a commercial, non-conductive filler material (Westinghouse Type 41485BM). See the above-cited U.S. Pat. Nos. 3,960,803 and 4,105,984. The strips were impregnated by immersion in the resin solution and drawn between glass rods. A final composition of 75% resin (by weight) was obtained by this process. Solvents were removed by evaporation at 135° C. for 2 minutes.

Test Bar Fabrication

Cavities and coils were simulated by milling four 0.63-inch by 0.750-inch by 11.000-inch (1.6-cm by 1.9-cm by 28-cm) slots in 12-foot long, 0.500-inch (365-cm by 1.3-cm) thick aluminum bars. Two such slots were milled on each side of the bar such that they were opposite each other. After cleaning the slots, the filler materials were cut to fill the slot completely. The filler materials were then partially cured at 85° C. for 2 hours with the fillers compressed so as not to exceed the total bar thickness of 0.500 inches (1.3 cm). The bars were then wrapped with several layers of mica tape, and impregnated.

Electrical Testing

Electrical testing was performed by wrapping copper foil electrodes around the bar in the following regions: one at each end of each slot, one in the center of the slot, and one well away from the slot area. In this way, the effect of the filler material on the electrical performance could be determined. Measurements of loss tangent and capacitance were performed at 60 Hz and the following applied voltages: 2.0, 4.4, 8.0, 13.0, 17.5, 22.0, and 26.5 kV.

Figure 5A:
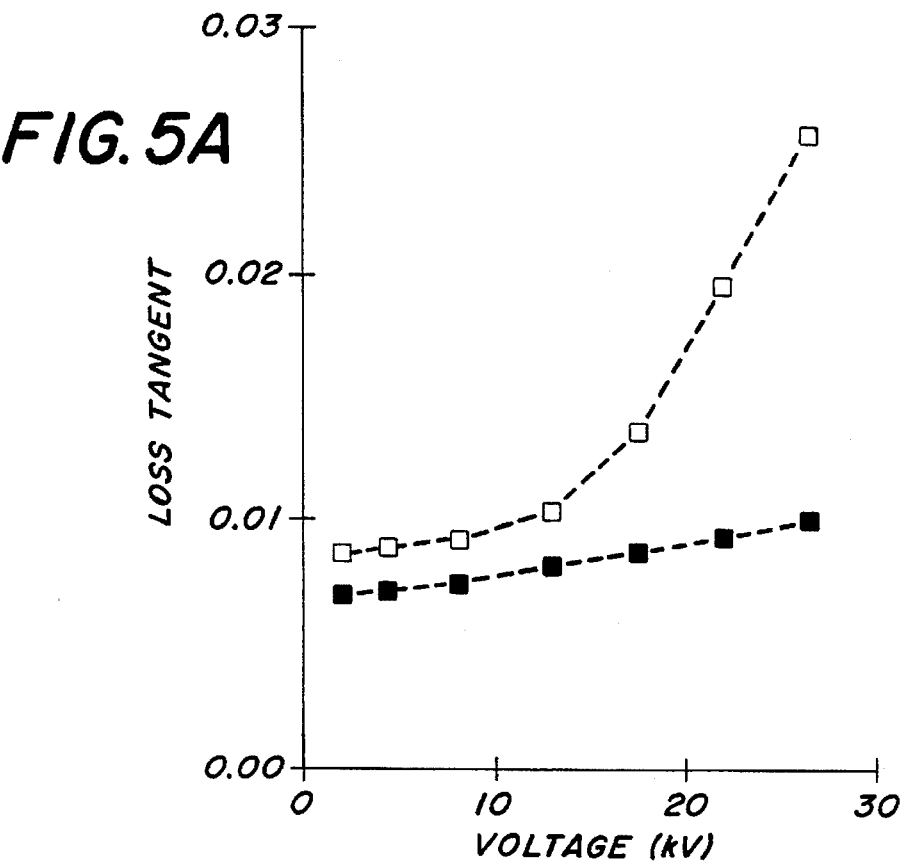
FIGS. 5A through 5D are data plots for the study described in Example 4.
Figure 5B:
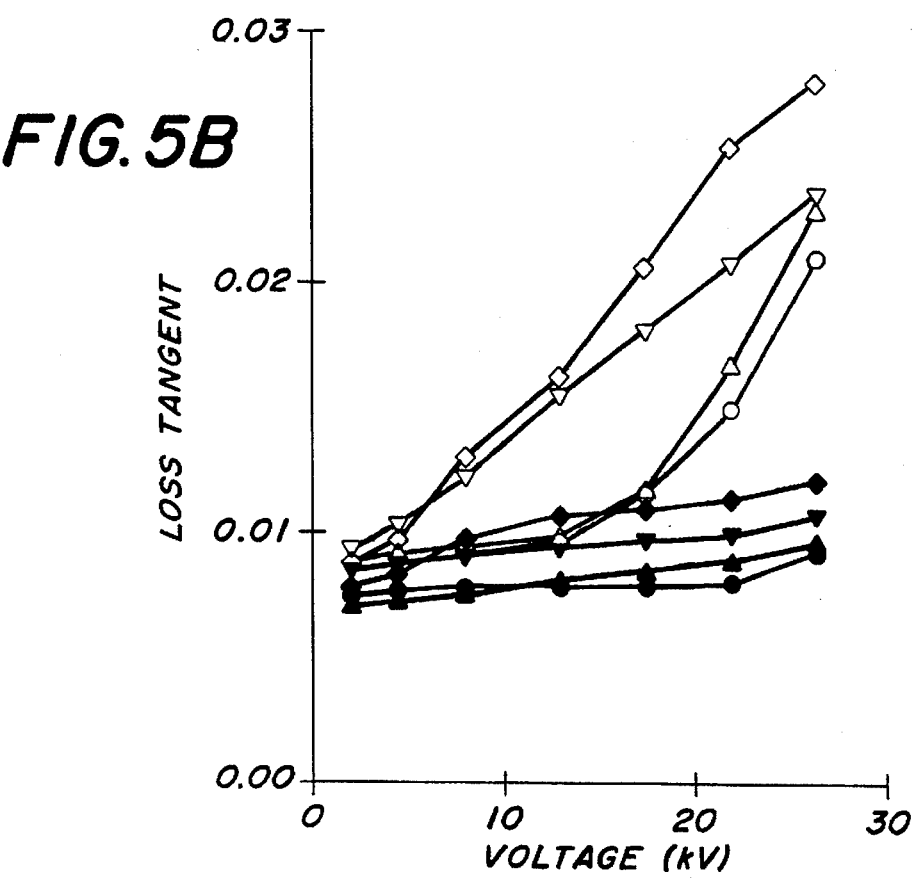

In addition to testing bars made using the partially conducting materials, bars made used insulating polyester were also evaluated. The tip-up commonly observed in the commercially available insulating filler is shown in FIG. 5A, which depicts measurements made over the filler (indicated by the open symbols) and over the solid bar (indicated by the filled symbols). The insulating filler impregnated in the laboratory showed similar behavior, as depicted in FIG. 5B, which depicts the results of measurements made over filler (open symbols) and over a solid bar (filled symbols).

Figure 5C:
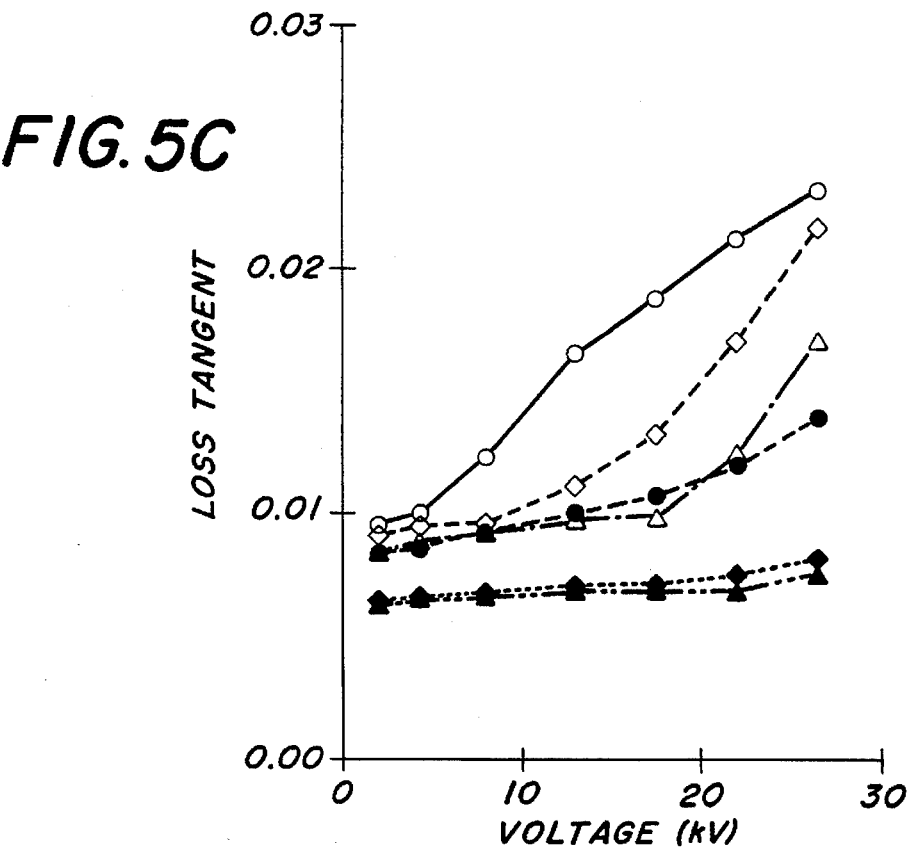
Figure 5D:
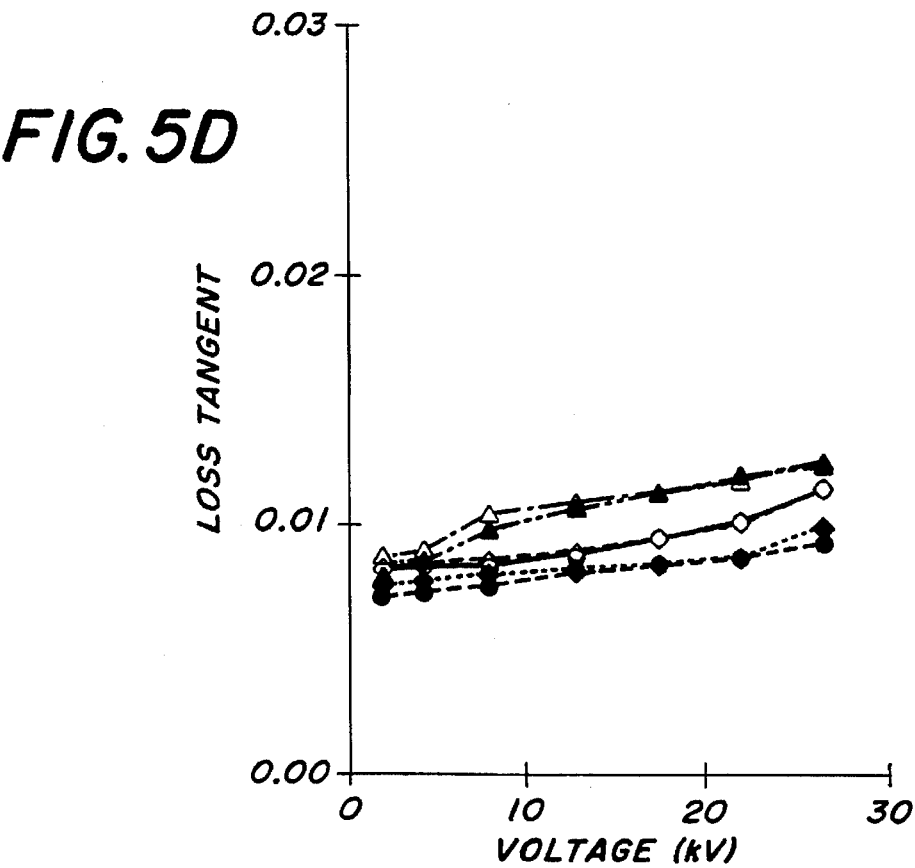

Bars made with polyaniline-coated polyester did not show significantly lower loss tangent tip-up than the insulating polyester. This is shown in FIG. 5C, which depicts the results of measurements made over the polyaniline-coated polyester filler material (open symbols) and over the solid bar (filled symbols). The polypyrrole-coated polyester, on the other hand, showed substantially better results. This is shown in FIG. 5D, which depicts the results of electrical performance measurements of the polypyrrole-coated polyester filler material in three different test bars.

Improved synthetic methods for preparing polyaniline have been developed. See Y. Wei, X. Tang, Y. Sun, W. W. Focke, *J. Poly. Sci. A.*, 1989, 27, 2385–2392. These improved methods may be employed in future work in this area. In addition, a more stable proton acid could be used in place of HCl in the polyaniline synthesis.

Tables 3 and 4 below summarize the results of this study.

TABLE 3

| Reaction Time | Resistance PPy (Ω/sq) | Resistance PAn (Ω/sq) |
| --- | --- | --- |
| 1 | 6600 | |
| 1.5 | | 6600 |
| 2 | 2500 | |
| 2.25 | | 2200 |
| 3 | 1100 | 2200 |

TABLE 3-continued

| Reaction Time | Resistance PPy (Ω/sq) | Resistance PAn (Ω/sq) |
|---|---|---|
| 4 | 700 | |
| 4.5 | | 1800 |
| 5 | 500 | |

TABLE 4

| Strip Designation | Resistance (kΩ/sq) |
|---|---|
| PPy-1 | 17.9 |
| PPy-2 | 8.8 |
| PPy-3 | 18.1 |
| PPy-4 | 20.8 |
| PAn-1 | 37.2 |
| PAn-2 | 28.9 |
| PAn-3 | 36.6 |
| PAn-4 | 39.3 |

We claim:

1. A high voltage coil comprising:
   a high voltage coil;
   an insulating wrap around said high voltage coil; and
   an electrically conductive prepreg for suppressing corona discharge, said prepreg including an electrically conductive fibrous felt saturated with a resin, and said prepreg being positioned between said high voltage coil and said insulating wrap.

2. A high voltage coil assembly as recited in claim 1, wherein said prepreg is positioned in a region of high electrical stress, particularly in the Roebel transposition used in rotating power machinery.

3. A high voltage coil assembly as recited in claim 1, wherein said electrically conductive fibrous felt comprises a polyester.

4. A high voltage coil assembly as recited in claim 3, wherein said polyester is DACRON polyester.

5. A high voltage coil assembly as recited in claim 1, wherein said felt material coated with a polyaniline composition.

6. A high voltage coil assembly as recited in claim 1, wherein said felt material coated with a polypyrrole composition.

7. A high voltage coil assembly as recited in claim 6, wherein said felt comprises a member of the group including DACRON polyester glass and KEVLAR fibers.

8. A high voltage device comprising a first conductor; an insulating wrap in close proximity to said first conductor, wherein a high electrical stress arises when a high voltage difference occurs between said first conductor and said insulating wrap; and an electrically conducting prepreg positioned between said first conductor and said insulating wrap, said prepreg including an electrically conductive fibrous felt saturated with a resin.

9. A high voltage device as recited in claim 8, wherein said prepreg is positioned in the region of high electrical stress.

10. A high voltage device as recited in claim 8, wherein said electrically conductive fibrous felt comprises a polyester.

11. A high voltage device as recited in claim 10, wherein said polyester is DACRON polyester.

12. A high voltage device as recited in claim 8, wherein said felt material coated with a polyaniline composition.

13. A high voltage device as recited in claim 8, wherein said felt material coated with a polypyrrole composition.

14. A high voltage device as recited in claim 13, wherein said felt comprises DACRON polyester.

15. A high voltage device comprising a first conductor; an insulator in close proximity to said first conductor, wherein a high electrical stress arises when a high voltage difference occurs between said first conductor and said insulator; and means for reducing corona discharge in a region of high electrical stress, wherein said means for reducing corona discharge in the region of high electrical stress comprises an electrically conductive prepreg, said prepreg including a an electrically conductive fibrous felt saturated with a resin.

* * * * *